H. HILL.
JOINT FOR BREWERS' AND LIKE PIPES.
APPLICATION FILED SEPT. 4, 1913.
1,113,994.
Patented Oct. 20, 1914.
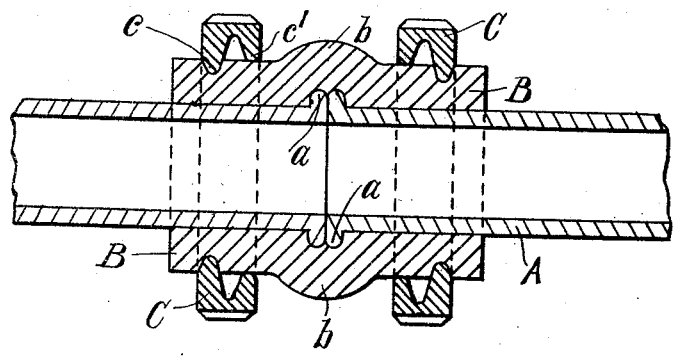
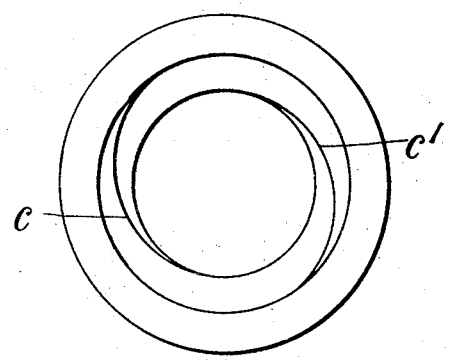
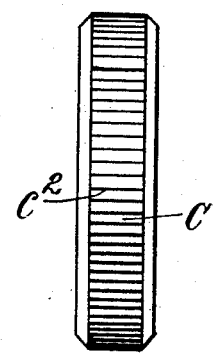
Witnesses:-
E. Greenberger.
C. A. Panaro
Inventor:-
Henry Hill
per J. B. ...
Attorney.

UNITED STATES PATENT OFFICE.

HENRY HILL, OF HOXTON, LONDON, ENGLAND.

JOINT FOR BREWERS' AND LIKE PIPES.

1,113,994. Specification of Letters Patent. Patented Oct. 20, 1914.

Application filed September 4, 1913. Serial No. 788,042.

*To all whom it may concern:*

Be it known that I, HENRY HILL, subject of the King of Great Britain and Ireland, residing at 92 New North road, Hoxton, London, in the county of London, England, have invented certain new and useful Improvements in Joints for Brewers' and like Pipes, of which the following is a specification.

My invention relates to improvements in joints for short lengths of tin or like pipe such as are used for the passage of beer or other liquids.

Such pipes are usually made of tin and of a length of about six inches and have a small flange at each end. These have been connected together by means of short lengths of india-rubber tube into which the ends of the pipes to be joined are forced until their flanges abut one against the other, also ferrules of various types having a single screw thread either parallel or tapered, have been used for screwing over the ends of the rubber tube to compress same around the flanged ends of the pipes.

In accordance with my invention I employ a special ferrule of brass or other suitable material to fit over the rubber connecting tubes and firmly secure the pipes together. These ferrules of brass or other material are slightly tapered internally and screwed with a double screw thread preferably of V section and are suitably milled or otherwise serrated on their exterior. One of these ferrules is screwed on to each end of the rubber connection as far up as the bulge, caused by the flanges on the ends of the lengths of pipe, will allow; thus compressing the rubber connections all around the pipes and forming a good liquor-tight joint. The use of a double thread in the ferrules causes them to engage the rubber connection simultaneously on opposite sides, facilitating their application; whereas if a single thread were employed, as the thread would engage on one side only great difficulty would be found in putting them on straight.

A joint made according to my invention may be readily taken apart for cleaning and be reassembled by any unskilled person.

In order that my invention may be more readily understood reference is had to the accompanying drawings in which:—

Figure 1 is a section through the ends of two lengths of pipe connected by my improved joint; and Figs. 2, 3 and 4 are respectively section, end view and side elevation to a larger scale of the ferrule employed therein.

In Fig. 1 A indicates the ends of two lengths of pipe of tin or other suitable material provided with flanges $a$. B is the tubular rubber connection within which the ends of the tubes A are forced and which the flanges $a$ cause to bulge out at $b$. C are the ferrules milled externally and slightly tapered internally and provided with double helical screw threads $c$ and $c^1$ preferably of V shape. One of these ferrules is screwed on to each end of the rubber connection B as far as the bulge $b$ will allow, compressing the rubber connection all around the end of each pipe.

Fig. 2 is a vertical section of a ferrule C clearly showing the two separate screw threads $c$ and $c^1$.

Fig. 3 is an end view of the ferrule showing the two screw threads $c$ and $c^1$ commencing on opposite sides thereof.

Fig. 4 is a side elevation showing the milling $c^2$ on the exterior of the ferrules C.

What I claim as my invention and desire to secure by Letters Patent is:—

1. Joint for brewers' pipes comprising in combination abutting flanged pipe ends, a rubber sleeve inclosing said abutting ends, rings placed on respective ends of said sleeve and a plurality of worms formed on the interior of each ring each worm being of decreasing diameter outward from the side disposed toward said abutting ends and the commencement of the large diameter part of each worm being arranged substantially diametrically opposite to the commencement of the corresponding part of another worm on the same ring.

2. Joint for brewers' pipes comprising in combination abutting flanged pipe ends, a rubber sleeve surrounding said abutting ends, rings placed on respective ends of said sleeve and two worms of a double threaded screw formed on the interior of each ring each worm being of gradually decreasing diameter and gradually increasing depth outward from the side of the ring disposed toward said abutting ends.

3. Joint for brewers' pipes; comprising in combination abutting flanged pipe ends, a rubber sleeve inclosing said ends, rings placed on respective ends of said sleeve two worms of a double threaded screw formed on the interior of each ring each worm being of decreasing diameter outward from the side of the ring disposed toward said abutting ends and the commencement of the large diameter part of one worm being arranged substantially diametrically opposite to the commencement of the corresponding part of the other worm and means upon the exterior of each of said rings to facilitate the turning thereof.

4. Joint for brewers' pipes; comprising in combination abutting flanged pipe ends, a rubber sleeve inclosing said ends and rings placed on the respective ends of said sleeve said rings each having a roughened outer surface and formed on its interior with two worms of a double threaded screw each worm being of gradually decreasing diameter and gradually increasing in depth outward from the side of the ring disposed toward said abutting ends.

In witness whereof I have hereunto set my hand in the presence of two witnesses.

HENRY HILL.

Witnesses:
JNO. H. RAYNER,
TRACY LAY.

Copies of this patent may be obtained for five cents each, by addressing the "Commissioner of Patents, Washington, D. C."